United States Patent
Bauer et al.

(10) Patent No.: US 11,465,748 B2
(45) Date of Patent: Oct. 11, 2022

(54) GALLEY MONUMENT FOR AN AIRCRAFT AND AIRCRAFT

(71) Applicant: Airbus Operations GmbH, Hamburg (DE)

(72) Inventors: Michael Bauer, Hamburg (DE); Falk Bajorat, Hamburg (DE)

(73) Assignee: Airbus Operations GmbH

( * ) Notice: Subject to any disclaimer, the term of this patent is extended or adjusted under 35 U.S.C. 154(b) by 457 days.

(21) Appl. No.: 16/451,438

(22) Filed: Jun. 25, 2019

(65) Prior Publication Data
US 2020/0002002 A1      Jan. 2, 2020

(30) Foreign Application Priority Data

Jun. 28, 2018   (DE) .................... 10 2018 210 642.8

(51) Int. Cl.
  *B64D 11/04*  (2006.01)
  *B64D 11/00*  (2006.01)
(52) U.S. Cl.
  CPC .......... *B64D 11/04* (2013.01); *B64D 11/0015* (2013.01)
(58) Field of Classification Search
  CPC ................ B64D 11/04; B64D 11/0015; B64D 2011/004
  See application file for complete search history.

(56) References Cited

U.S. PATENT DOCUMENTS 6,412,848 B1 *  7/2002  Ceccanese ............. B60K 35/00
                                                    296/37.7
6,476,879 B1 * 11/2002  Ho ......................... A47C 7/723
                                                    348/837
(Continued)

FOREIGN PATENT DOCUMENTS

DE      1938030 A1    1/1971
DE      3719105 A1   12/1988
(Continued)

OTHER PUBLICATIONS

Bucher Leichtbau AG: Galley FallandeniZurich, Schweiz, 2011—Firmenschrift (company publication 2011).
(Continued)

*Primary Examiner* — Timothy D Collins
*Assistant Examiner* — Justin Michael Heston
(74) *Attorney, Agent, or Firm* — Lerner, David, Littenberg, Krumholz & Mentlik, LLP

(57) ABSTRACT

A galley monument for an aircraft has a shelf structure, a pull-out member supported on the shelf structure so as to be able to be moved between an insertion position and a deployment position and has a carrier plate, and a display device supported on the pull-out member and having a display. A first surface of the carrier plate in the deployment position of the pull-out member is located in a deployment plane and protrudes with respect to the shelf structure and is located in the insertion position at least partially inside the shelf structure. The display device in the deployment position of the pull-out member can be pivoted about a centre of rotation between a storage position, in which the display device extends parallel with the deployment plane, and a position for use, in which the display device extends transversely relative to the deployment plane.

17 Claims, 4 Drawing Sheets

(56) References Cited

U.S. PATENT DOCUMENTS

| | | | |
|---|---|---|---|
| 8,934,063 B2 * | 1/2015 | Boyer, Jr. | B64D 11/00153 |
| | | | 348/837 |
| 8,939,403 B2 * | 1/2015 | Hacker | A47B 96/025 |
| | | | 244/118.5 |
| 2003/0159628 A1 | 8/2003 | Salzer et al. | |
| 2006/0075934 A1 * | 4/2006 | Ram | B64D 11/00155 |
| | | | 108/44 |
| 2008/0116318 A1 * | 5/2008 | Wesley | F16M 13/02 |
| | | | 244/118.5 |
| 2008/0136299 A1 | 6/2008 | Peurifoy | |
| 2013/0070171 A1 | 3/2013 | Boyer, Jr. | |
| 2013/0187000 A1 | 7/2013 | Godecker et al. | |

FOREIGN PATENT DOCUMENTS

| | | | |
|---|---|---|---|
| DE | 19705754 A1 | 8/1998 | |
| DE | 102011114939 A1 | 4/2013 | |
| DE | 20 2017 004 091 U1 | 8/2017 | |
| DE | 202017004091 U1 * | 8/2017 | B64D 11/04 |
| EP | 3153761 A1 | 4/2017 | |
| WO | 2008066722 A2 | 6/2008 | |

OTHER PUBLICATIONS

Dec. 10, 2009, E-CAB project („E-enabled Cabin and Associated Logistics for Improved Passenger Services and Operational Efficiency; https://cordis.europa.eu/docs/publications/1228/122807331-6_en.pdf).

French Search Report for Application No. 1906641 completed Jul. 3, 2020, 1 page.

* cited by examiner

GALLEY MONUMENT FOR AN AIRCRAFT AND AIRCRAFT

FIELD OF THE INVENTION

The present invention relates to a galley monument for an aircraft and an aircraft.

BACKGROUND OF THE INVENTION

Galleys of passenger aircraft typically comprise one or more galley monuments, that is to say, individually prefabricated shelf-like or cupboard-like built-in groups, which often have a monolithic base structure and provide different functions in an integrated manner. Such galley monuments generally have sliding compartments which are provided to receive containers and/or rolling containers ("trolleys" or "galley carts") and/or for receiving different galley components for preparing meals and/or drinks. Galley components are, for example, hot water boilers, coffee machines, hot air ovens, hot plates, sinks, cooling containers, refrigerators and the like.

In order to provide passengers with the maximum possible space, attempts are made to integrate the galley monuments in the inner space of the aircraft in the most space-saving manner possible. In particular in passenger aircraft, however, the requirement for service functions and monitoring functions which are available in the cabin is also increasing. For example, there are often installed in aircraft cabins monitoring cameras whose image recordings are reproduced on a display so that the aircraft personnel can constantly monitor the passengers.

Some of these requirements were set out in the so-called E-CAB project ("E-enabled Cabin and Associated Logistics for Improved Passenger Services and Operational Efficiency"; cordis.europa.eu/docs/publications/1228/122807331-6_en.pdf), in which a galley monument having a display was developed.

Furthermore, DE 20 2017 004 091 U1 proposes a cabin monument in the form of a combined toilet/galley unit having an integrated display. The monument may, in addition to sliding compartments for containers, have a storage compartment for receiving the display in a position for non-use or the display is securely fitted to a container and can be inserted into or pulled out of a sliding compartment therewith.

BRIEF SUMMARY OF THE INVENTION

Aspects of the present invention may provide a galley monument in which a display device is integrated in an improved manner.

According to a first aspect of the invention, a galley monument for an aircraft having a shelf structure, a pull-out member and a display device is provided. The pull-out member can be moved between an insertion position and a deployment position, preferably in a translational manner. The pull-out member has a carrier plate, wherein a first surface of the carrier plate in the deployment position of the pull-out member is located in a deployment plane and protrudes with respect to the shelf structure. In the insertion position, the carrier plate or the first surface of the carrier plate is located at least partially inside the shelf structure. The display device has a display for reproducing graphical information, wherein the display device is supported or fitted on the pull-out member. In particular, the display device in the deployment position of the pull-out member can be pivoted about a centre of rotation between a storage position, in which the display device extends parallel with the deployment plane, and a position for use, in which the display device extends transversely relative to the deployment plane.

According to another aspect of the invention, an aircraft having such a galley monument is provided.

A notion forming the basis of the invention involves integrating a display device in a pull-out member which can be deployed with a carrier plate from the shelf structure of the galley monument and folding out the display device in the deployment position of the pull-out member from the plane of the carrier plate. This affords the advantage that, in the storage position of the display device, a particularly flat and space-saving arrangement is achieved with respect to the carrier plate. The carrier plate or the pull-out member on the whole advantageously provide a mechanically stable securing structure for the display device which can additionally be used in the deployment position of the pull-out member for additional tasks, for example, as a storage surface.

According to an embodiment of the galley monument, there is provision for the centre of rotation, about which the display device can be pivoted, to be arranged in a first end region of the carrier plate, wherein the first end region of the carrier plate in the deployment position of the pull-out member is located facing the shelf structure. As a result of the arrangement of the centre of rotation close to the shelf structure, in the position for use of the display device an entire longitudinal extent of the carrier plate between the centre of rotation and a second end region of the carrier plate located opposite the first end region can advantageously be used as a work surface.

According to another embodiment, the centre of rotation, about which the display device can be pivoted, is arranged in a second end region of the carrier plate, wherein the second end region of the carrier plate in the deployment position of the pull-out member is located facing away from the shelf structure. This configuration affords the advantage that the pull-out member, after the display device has been pivoted into the position for use, can be moved if necessary into the insertion position again so that the size of the work surface provided by the carrier plate can be selected in a flexible manner or can be reduced in a space-saving manner. Furthermore, this is advantageous in order, for example, to be able to rapidly increase escape routes by moving the pull-out member into the insertion position.

Regardless of the arrangement thereof, the centre of rotation may, for example, be constructed in the form of an axis of rotation which is fixed relative to the carrier plate. The axis extends parallel with the deployment plane. Preferably, the pull-out member can be moved in translation parallel with the deployment plane in a deployment direction between the insertion position and the deployment position. For example, a corresponding arrangement of guide rails may be provided for this purpose. The centre of rotation or the axis of rotation preferably extends transversely relative to the deployment direction, but may also extend in the deployment direction.

According to another embodiment, a receiving recess is formed in the first surface of the carrier plate, wherein the display device in the storage position is arranged in the receiving recess. The receiving recess may, for example, be constructed as a recess or as a through-opening which extends between the first surface and a second surface of the carrier plate located opposite it. As a result of the provision of a receiving recess, the display device may in the storage position be arranged completely or partially inside the cross-sectional thickness of the carrier plate, whereby the spatial requirement of the display device is further reduced.

According to another embodiment of the galley monument, there is provision for the display of the display device to be orientated in the storage position in the opposite direction to the first surface of the carrier plate. In this manner, in the storage position of the display device, a non-sensitive rear side of the display device is orientated in the same manner as the first surface of the carrier plate. That is to say, this rear side of the display device can advantageously be used as a work surface whilst the display is protected against damage.

According to an alternative embodiment, the display of the display device in the storage position is orientated in the same direction as the first surface of the carrier plate. This affords the advantage that the display in the storage position in a viewing direction towards the first surface of the carrier plate can also be seen and where applicable operated.

According to another embodiment, there is provision for the display device to be pivotably supported on the pull-out member by means of an articulation device. The articulation device defines in this instance the centre of rotation about which the display device can be pivoted. For example, the display device can be supported directly on the carrier plate by means of the articulation device.

Optionally, supply lines for supplying the display device, such as, for example, power or data lines, inside the articulation device extend between the pull-out member and the display device. Lines can accordingly be guided through the articulation device, in a similar manner to the way in which a display cable extends through the hinge of a laptop.

According to another embodiment, there is provision for the display device to be releasably coupled to the articulation device by means of a coupling device. For example, the display device may be constructed to be able to be locked, that is to say, coupled in a positive-locking manner, to a coupling structure which is constructed on the coupling device. The coupling device preferably ensures in this instance at the same time mechanical coupling of the display device to the articulation device and an electrical or functional coupling between the display device and the supply connections which are where applicable provided in the articulation device. The releasable coupling affords the advantage that the display device can be released in a simple manner from the pull-out member for maintenance or cleaning purposes.

In particular, the coupling device may be constructed as a frame by means of which the display device can be locked. The frame may, for example, be constructed as a type of vessel, in which the display device can be inserted with a rear side of the display device opposite the display. Preferably, a peripheral edge region of the display device is locked to the frame.

According to another embodiment, a securing device is provided for securing the display device in the position for use and/or in the storage position. This affords the advantage that the display device can be fixed in a specific, adjusted position. A position of the display device is thereby also not changed by means of shaking or impacts, which is advantageous, in particular during take-off and landing, when the flight personnel have to be seated on a seat and are supposed to have the display device in view in the position for use.

According to another embodiment, the galley monument has an actuator by means of which the display device can be moved between the position for use and the storage position. The actuator may, for example, be formed by means of an electric motor. Optionally, the actuator is kinematically coupled to the display device via the articulation device. As a result of the actuator, the movement of the display device between the position for use and the storage position is facilitated and can in particular be automated. For example, there may be provision for the actuator to be able to be functionally coupled to a control device of the aircraft, wherein the control device of the aircraft is configured to produce control signals as a result of which the display device can be moved from the position for use into the storage position, for example, when a specific flight status is present.

Optionally, the actuator is functionally coupled to a processor unit of the display device, wherein the processor unit is configured to control the actuator. The display may in this instance advantageously be used as an input device for control commands so that the display device can be folded up by activating a control face on the display by means of the actuator.

In this context, a display device is intended in particular to be understood to be an electronic optical display, such as, for example, an LED, OLED, TFT or LCD screen or the like, with or without background illumination. In this instance, the display device may also have touchscreens or the like, which in addition to information output also enable input via a screen or display which acts as a touchpad.

With respect to directional indications and axes, in particular directional indications and axes which relate to the extent of physical structures, an extent of an axis, a direction or a structure "along" another axis, direction or structure is intended in this instance to be understood to mean that they, in particular the tangents which are produced in a respective location of the structures, each extend at an angle less than or equal to 45 degrees, preferably less than 30 degrees and particularly preferably parallel with each other.

With respect to directional indications and axes, in particular directional indications and axes which relate to the extent of physical structures, an extent of an axis, a direction or a structure "transversely" relative to another axis, direction or structure is intended in this instance to be understood to mean that they, in particular the tangents which are produced in a respective location of the structures, each extend at an angle greater than or equal to 45 degrees, preferably greater than or equal to 60 degrees and particularly preferably perpendicularly to each other.

BRIEF DESCRIPTION OF THE DRAWINGS

The invention is explained below with reference to the Figures of the drawings. In the Figures.

DETAILED DESCRIPTION

Figure 1:
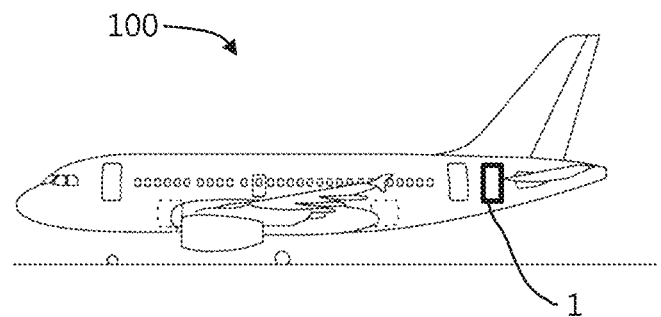
FIG. 1 is a simplified, schematic view of an aircraft according to an embodiment of the present invention.

In the Figures, the same reference numerals refer to identical or functionally identical components, unless stated otherwise.

Figure 2:
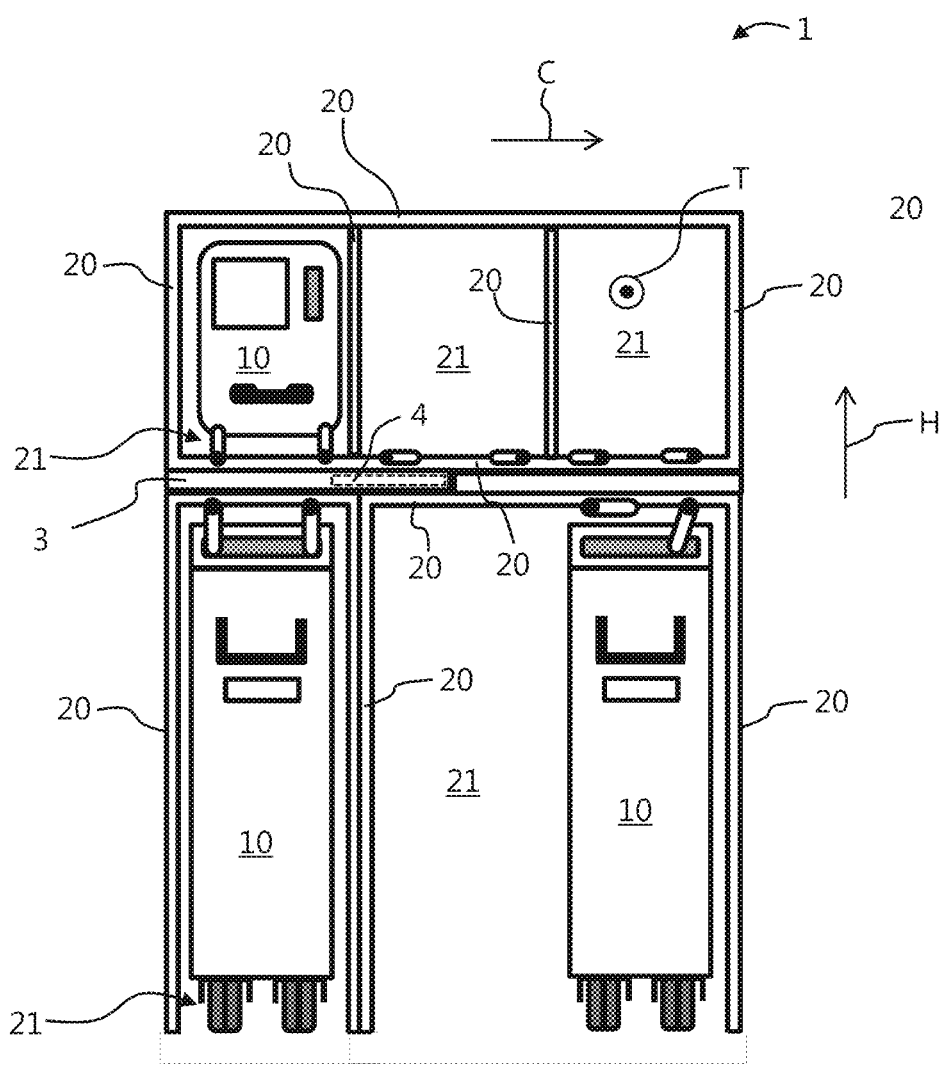
FIG. 2 is a schematic plan view of a front side of a galley monument according to an embodiment of the present invention.

FIG. 2 shows a schematic front view of a galley monument 1. This monument may be provided, for example, in a passenger cabin of an aircraft 100, in particular a passenger aircraft, as illustrated by way of example in FIG. 1. As can be seen in FIG. 1, the galley monument 1 may, for example, be arranged in the region of the rear of the aircraft 100 close to an entry region.

The galley monument 1 which is illustrated in FIG. 2 purely by way of example has a shelf structure 2 and a pull-out member 3. The shelf structure 2 has one or more sliding compartments 21. The sliding compartments 21 are each defined by compartment walls 20. The compartment walls 20 and consequently the sliding compartments 21 extend in a depth direction T of the galley monument 1. The sliding compartments 21 are constructed to receive one or more galley components 10, for example, in the form of rolling containers, as illustrated in FIG. 2 for lower insertion compartments 20, or in the form of boxes, as illustrated in FIG. 2 by way of example for the sliding compartment 21. As illustrated by way of example in FIGS. 3 and 4, a refrigerator, coffee machines or other objects can also be received as galley components 10 in the sliding compartments 21.

The arrangement or classification of sliding compartments 21 as illustrated in FIG. 2 is purely exemplary. Of course, the shelf structure 2 may also have a different arrangement of sliding compartments 21 which extend in the depth direction T, which arrangement is defined by compartment walls 20 which extend in the depth direction T, as illustrated in FIG. 2.

The pull-out member 3 of the galley monument 1 may in particular be arranged between two sliding compartments 21, as illustrated by way of example in FIGS. 2 to 7. In particular, the pull-out member 3 may be arranged with respect to a height direction H between the sliding compartments 21. As can be seen in particular in FIGS. 3 to 6, the pull-out member 3 has a carrier plate 30 which extends in a planar manner with a planar first surface 30a. Optionally, the pull-out member 3 may additionally have a plate frame 35 which encloses a peripheral edge of the carrier plate 30, as illustrated by way of example in FIGS. 3 to 6.

The pull-out member 3 is supported on the shelf structure 2, for example, on a compartment wall which forms a base or a ceiling of the sliding compartment 21 with respect to the vertical direction H. Furthermore, the pull-out member 3 can be moved between an insertion position and a deployment position. In FIGS. 3 to 6, the pull-out member 3 is illustrated in the deployment position. As can be seen in FIGS. 3 to 6, the pull-out member 3 protrudes in the deployment position with respect to the shelf structure 2. As illustrated by way of example in FIGS. 3 to 6, there may be provision for the pull-out member 3 to protrude in the deployment position with respect to the depth direction T relative to the shelf structure 2. In the deployment position of the pull-out member 3, the first surface 30a of the carrier plate 30 is located in a deployment plane E30. Preferably, the pull-out member 3 can be moved in translation parallel with the deployment plane E30 in a deployment direction R3 between the insertion position and the deployment position. Optionally, the deployment direction R3 extends in the depth direction T of the galley monument 1, as shown by way of example in FIGS. 3 to 6. It is also conceivable for the deployment direction R3 to extend transversely relative to the depth direction T and transversely relative to the vertical direction H, that is to say, in a transverse direction C of the galley monument 1 so that the pull-out member 3 in the deployment position protrudes laterally with respect to the shelf structure 2 (not illustrated).

Figure 7:
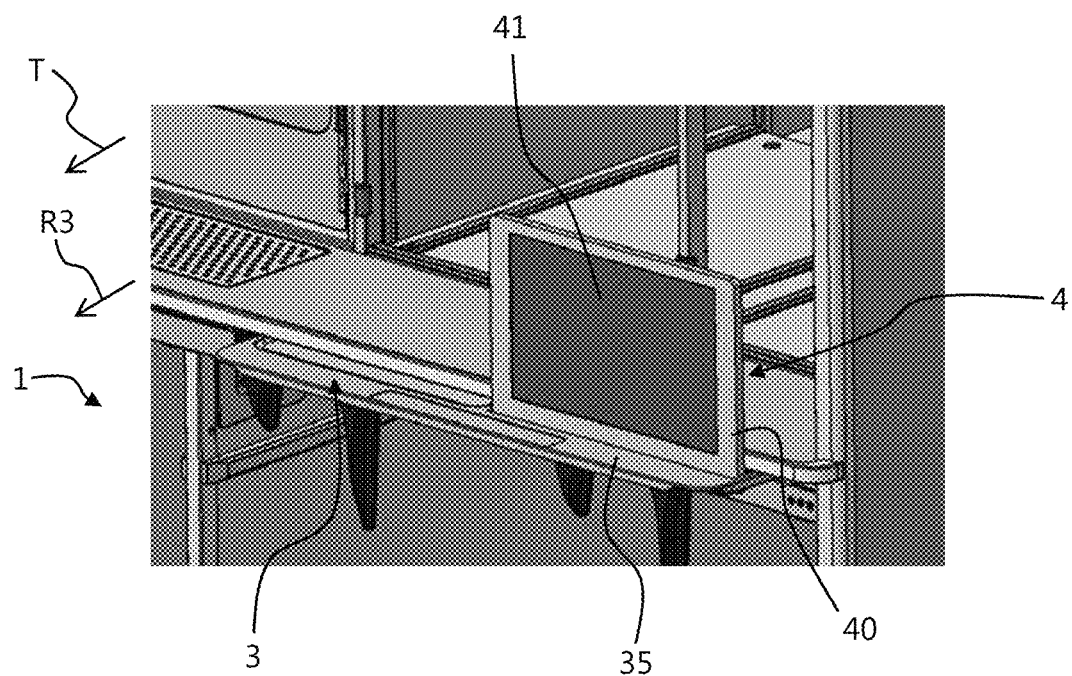
FIG. 7 is a perspective partial view of the front side of the galley monument illustrated in FIG. 5, wherein the pull-out member is arranged in an insertion position and the display device is arranged in a position for use.

In the insertion position, the pull-out member is at least partially located inside the shelf structure 2, as illustrated by way of example in FIG. 7. The insertion position may in particular be defined in that at least 50 percent, preferably at least 75 and particularly preferably at least 90 percent, of the longitudinal extent of the carrier plate 30 is arranged in the deployment direction R3 within the shelf structure 2. In order to guide the pull-out member 3 between the insertion position and the deployment position, for example, there may be provided an arrangement of guide rails which is secured to the shelf structure 2, which guide rails are not illustrated and define the deployment direction R3.

In the galley monuments 1 illustrated by way of example in FIGS. 2 to 6, the carrier plate 30 of the pull-out member 3 is arranged in the deployment position of the pull-out member 3 with respect to the depth direction T in front of a storage surface 11a which is provided on the sliding compartments 21 and which preferably extends parallel therewith.

Figure 8:
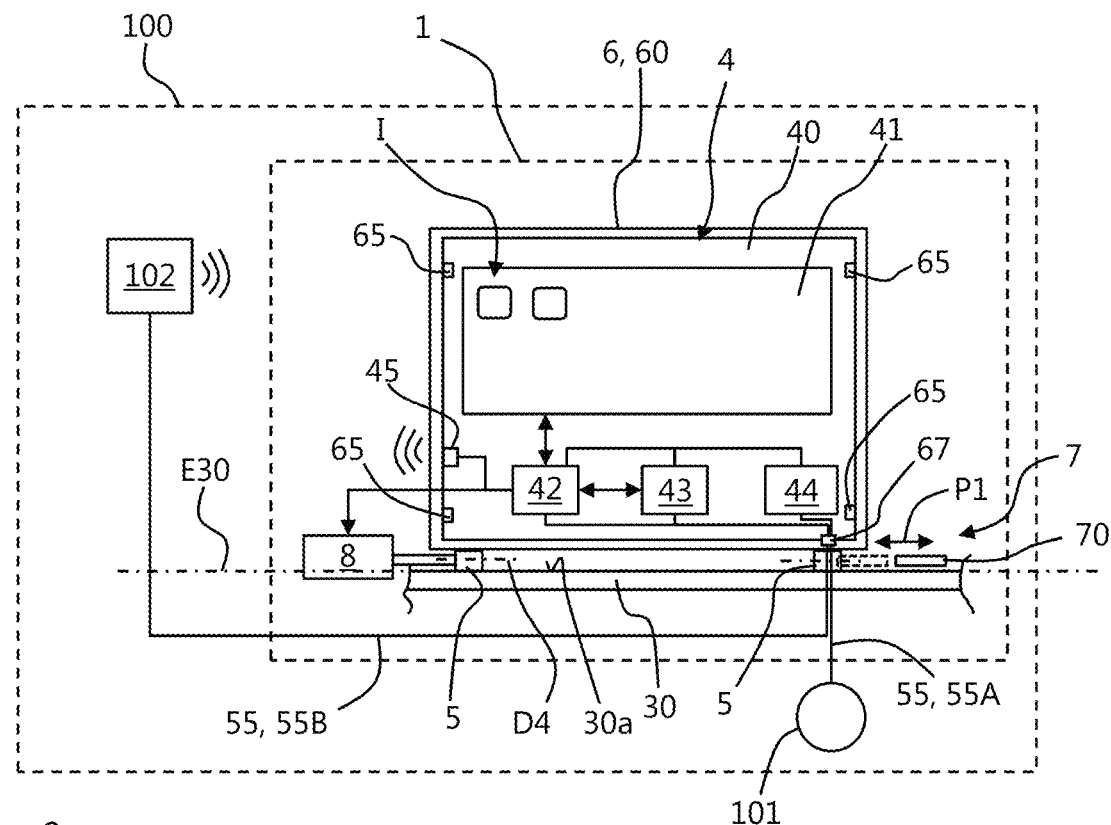
FIG. 8 is a simplified schematic illustration of a partial view of a galley monument according to another embodiment of the present invention, wherein a display device is arranged in a position for use.

As indicated schematically in FIG. 2 and as can be seen in FIGS. 3 to 7, the galley monument 1 further has a display device 4. The display device 4 has a housing 40 and a display 41 which is fitted to the housing 40. As schematically illustrated in FIG. 8, the display device 4 optionally further has a processor unit 42, a data store 43 and an electrical energy store 44, for example, in the form of an accumulator. The display 41 is configured to reproduce graphical information I and may, for example, be an LED, OLED, TFT or LCD screen. Furthermore, the display 41 may also be configured to be touch-sensitive for the input of information, that is to say, as a so-called touch screen.

The display device 4 is pivotably supported on the pull-out member 3, for example, on the carrier plate 30, about a centre of rotation D4. The display device 4 can in this instance be pivoted between a storage position, which is illustrated, for example, in FIGS. 3 and 5, and a position for use which is illustrated by way of example in FIGS. 4, 6 and 7.

Figure 3:
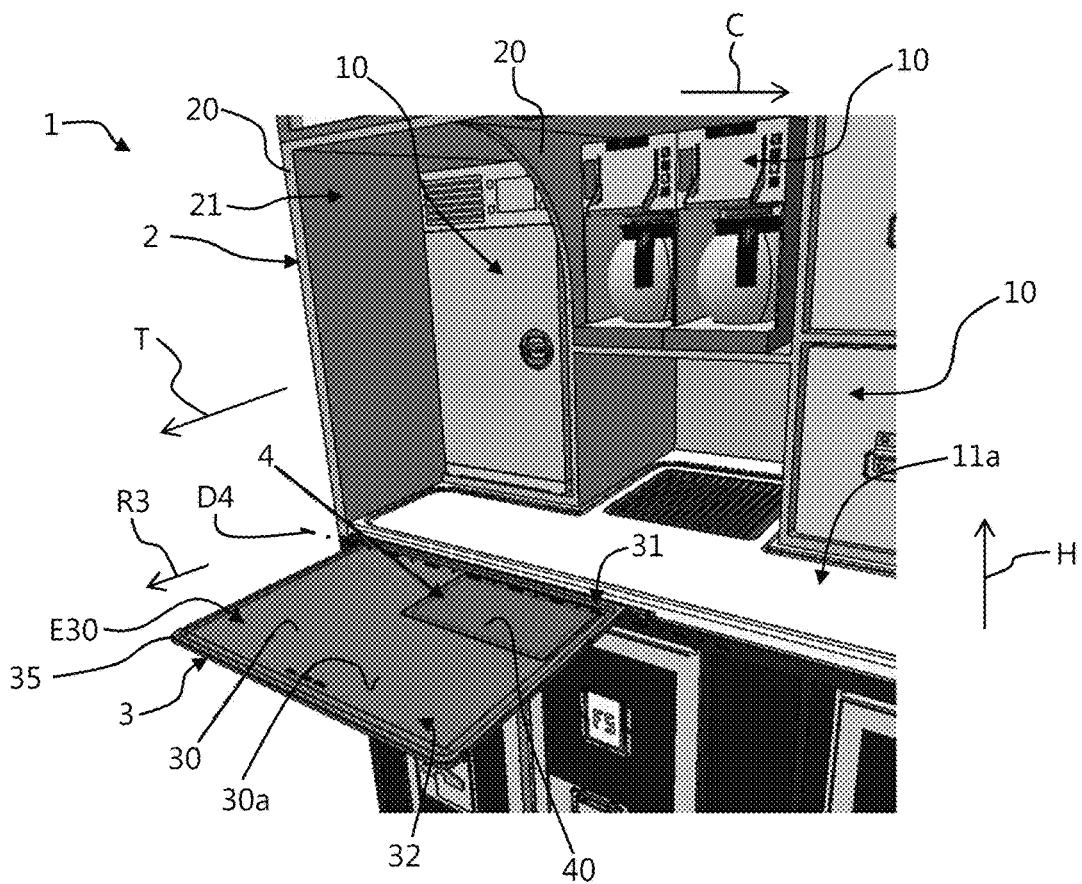
FIG. 3 is a perspective partial view of the front side of a galley monument according to an embodiment of the present invention, wherein a pull-out member of the galley monument is arranged in a deployment position and a display device is arranged in a storage position.

In the storage position, the display device 4 extends parallel with the deployment plane E30. The display 41 of the display device 4 may in the storage position be orientated in the opposite direction to the first surface 30a of the carrier plate 30, as illustrated by way of example in FIG. 3. The housing 41 thereby forms a portion of a work surface which is provided by the first surface 30a of the carrier plate 30, as can be seen in FIG. 3. In particular, the display 40 is thereby well protected from damage in the storage position. Alternatively, the display 41 in the storage position may also be orientated in the same direction as the first surface 30a of the carrier plate 30, as illustrated by way of example in FIG. 5. It is thereby possible for the information reproduced by the display 41 to also be read in the storage position when the pull-out member 3 is arranged in the deployment position.

In the position for use, the display device 4 extends transversely relative to the deployment plane E30. For example, the display device 4 may be pivoted from the storage position through an angle between 30 degrees and 120 degrees with respect to the deployment plane E30 about the centre of rotation D4.

Generally, the centre of rotation D4 is arranged in such a manner that the display device 4 can be pivoted in the deployment position of the pull-out member 3 between the storage position and the position for use. In FIGS. 3 to 7, the centre of rotation D4 is, for example, constructed as a fixed rotation axis and may, for example, be defined by means of an articulation device 5 which couples the display device 4 to the pull-out member 3. The articulation device 5 may, for example, be produced in the form of a hinge, as will be explained in greater detail below. FIGS. 3 to 7 further show by way of example that the rotation axis which forms the centre of rotation D4 extends transversely relative to the deployment direction R3 or transversely to the depth direction T.

Figure 4:
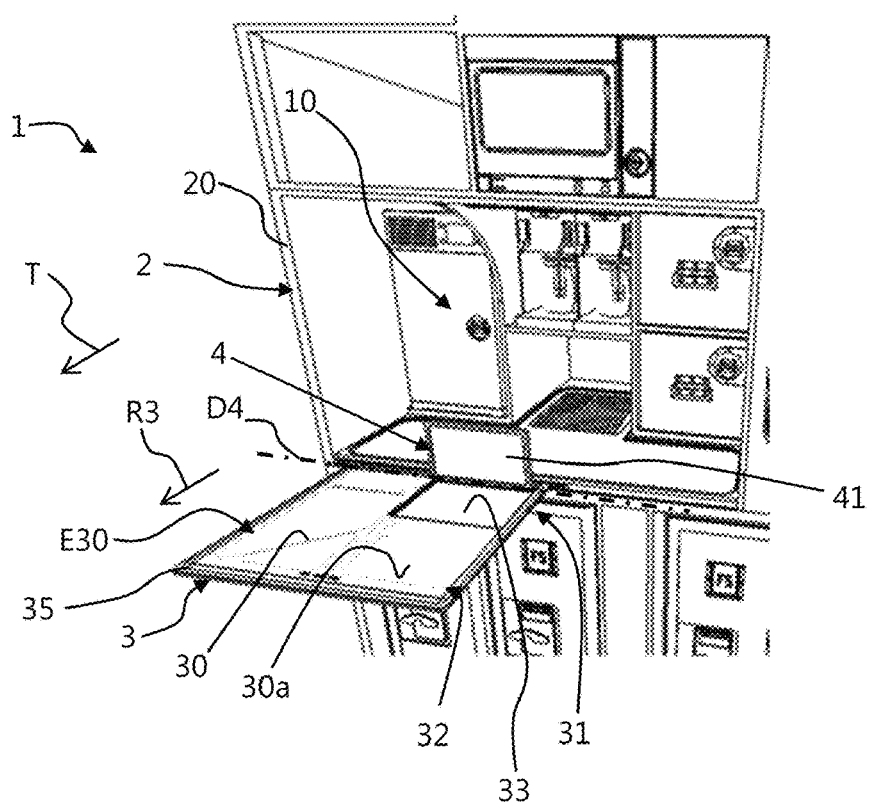
FIG. 4 is a perspective partial view of the front side of the galley monument illustrated in FIG. 3, wherein the display device is arranged in a position for use.

In the galley monument which is shown in FIGS. 3 and 4 by way of example, the centre of rotation D4 is arranged in a first end region 31 of the carrier plate 30. FIG. 3 shows the pull-out member 3 in the deployment position. As can be seen, the first end region 31 of the carrier plate 30 is located facing the shelf structure 2 in the deployment position of the pull-out member 3. In order to use the display device 4, the pull-out member 3 is first moved from the insertion position (not illustrated) into the deployment position illustrated in FIG. 3. Afterwards, the display device 4 is pivoted into the position for use about the centre of rotation D4 located close to the shelf structure 2, as illustrated by way of example in FIG. 4.

As can further be seen in FIG. 4, a receiving recess 33 is formed in the first surface 30a of the carrier plate 30. This may in particular be constructed as a recess, as illustrated in FIG. 4. As can be seen in FIGS. 3 and 4, the display device 4 is arranged in the storage position in the receiving recess 33. In particular, the receiving recess 33 may have with respect to a cross-section of the carrier plate 30 a depth which is greater than or equal to a thickness of the display device 4. In the storage position of the display device 4, the display device 4 consequently preferably extends flush with the first surface 30a of the carrier plate 30.

Figure 5:
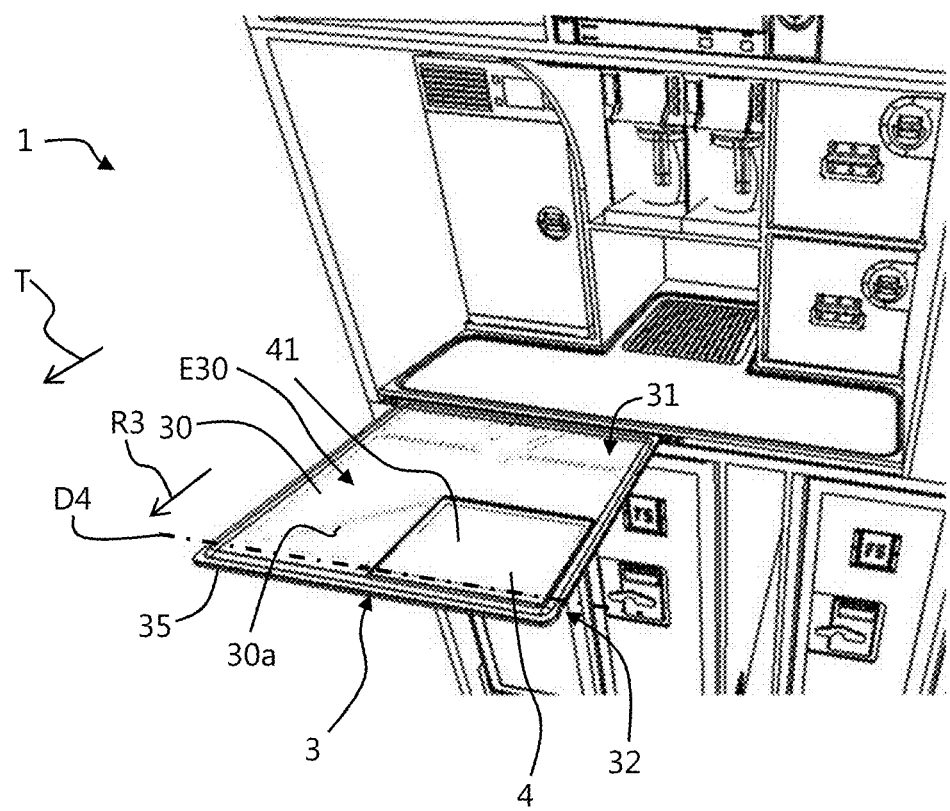
FIG. 5 is a perspective partial view of the front side of a galley monument according to another embodiment of the present invention, wherein a pull-out member of the galley monument is arranged in a deployment position and a display device is arranged in a storage position.
Figure 6:
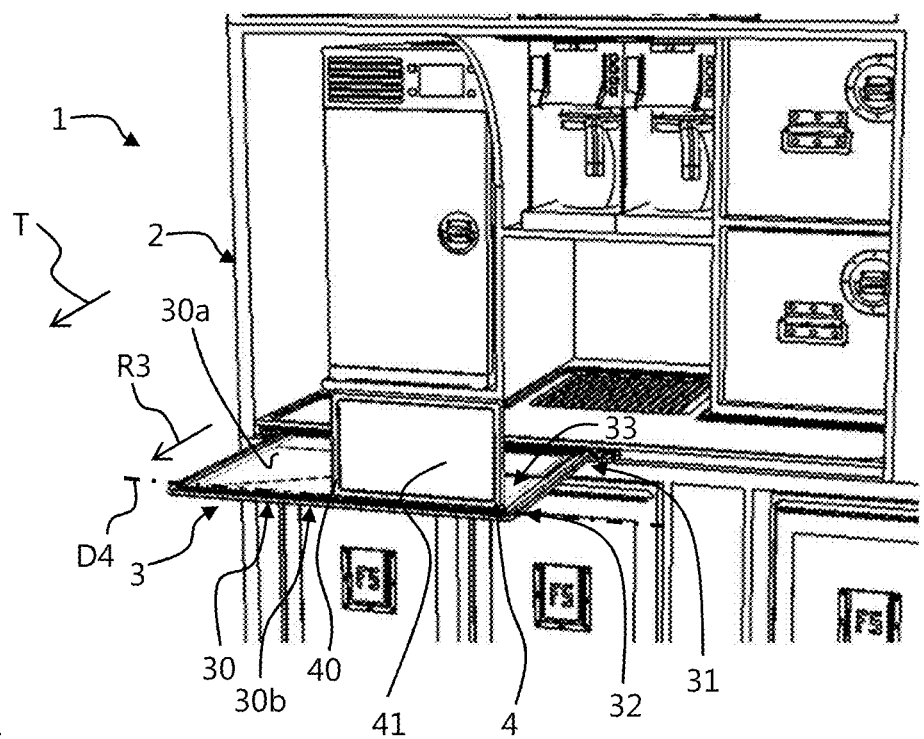
FIG. 6 is a perspective partial view of the front side of the galley monument illustrated in FIG. 5, wherein the pull-out member is arranged in the deployment position and the display device is arranged in a position for use.

In the galley monument 1 which is illustrated by way of example in FIGS. 5 to 7, the centre of rotation D4 is arranged in a second end region 32 of the carrier plate 30. The second end region 32 of the carrier plate 30 is with respect to the deployment direction R3 located opposite the first end region 31 and consequently in the deployment position of the pull-out member 3 facing away from the shelf structure 2. In order to use the display device 4, the pull-out member 3 is first moved from the insertion position into the deployment position illustrated in FIG. 5. In particular, the pull-out member 3 is moved so far in the deployment direction R3 from the shelf structure 2 that the display device 4 is arranged outside the shelf structure 2. Afterwards, the display device 4 is pivoted about the centre of rotation D4 which is located facing away from the shelf structure 2 with respect to the deployment direction R3 into the position for use, as illustrated by way of example in FIG. 6. This arrangement of the centre of rotation D4 affords the advantage that the pull-out member 3, after the display device 4 has been pivoted into the position for use, can be moved into the insertion position again, as illustrated by way of example in FIG. 7. The pull-out member 3 then protrudes only minimally from the shelf structure 2 and consequently takes up hardly any more space in the cabin of the aircraft 100.

As illustrated in FIG. 6, the optional receiving recess 33 may also be constructed as a through-opening which extends between the first surface 30a of the carrier plate 30 and a second surface 30b which is located opposite it. In this instance, there may also be provision for the display device 4 in the storage position to extend flush with the first surface 30a of the carrier plate 30, as illustrated by way of example in FIG. 5.

FIG. 8 is a schematic/functional illustration of a galley monument 1 inside an aircraft 100. In FIG. 8, the display device 4 is illustrated in the position for use. The display device 4 is pivotably supported on the carrier plate 30 by means of an articulation device 5 in the form of hinges, for example, two hinges.

As illustrated schematically in FIG. 8, supply lines 55 for supplying the display device 4 may extend inside the articulation device 5 between the pull-out member 3 and the display device 4. In FIG. 8, an electrical supply line 55A and a data line 55B are illustrated as supply lines 55. The electrical supply line 55A connects an electrical voltage source 101 of the aircraft 100 to the optional electrical energy store 44 or directly to the processor unit 42 of the display device 4. The data line 55B connects a data source 102 of the aircraft 100 to the processor unit 42 and/or the data store 43 of the display device 4. Of course, additional supply lines 55, in particular in the form of data lines to different data sources, can also be provided.

Alternatively or additionally, the display device 4 may have a wireless communication interface 45, for example, in the form of a WIFI interface, which is configured for wireless data transmission.

The data received via the data line 55A or the communication interface 45 can be reproduced as graphical information I by the display 41. For example, the data source 102 may be a monitoring camera whose recording is reproduced by the display 41. It is also conceivable for the data source to contain data relating to orders from passengers, which are then provided as graphical information I by the display 41 on the galley monument 1 for the cabin personnel.

As further illustrated schematically in FIG. 8, the display device 4 may be locked with a coupling device 6 which is constructed, for example, as a frame 60. The coupling device 6 is coupled to the articulation device 5 or connected thereto. The display device 4 is thereby releasably coupled by means of the coupling device 6 to the articulation device. The frame 60 may, for example, surround the outer periphery of the housing 40 of the display device 4. Furthermore, a locking structure 65 for locking the frame 60 and the housing 40 is provided on the frame 60 and/or on the housing 40. In FIG. 8, the locking structure 65 is illustrated schematically by clips which are provided on the frame 60. There may in particular be formed on the coupling device 6 an electromechanical interface 67 which is provided electrical contacts (not illustrated) for contacting with electrical contacts (not illustrated) provided on the display device 4 in order to enable an electrical connection to the supply lines 55 when the display device 4 is coupled to the coupling device 6.

As further illustrated in FIG. 8, a securing device 7 for securing the display device 4 in the position for use and/or in the storage position may be provided. The securing device may, for example, have a locking piece 70 which is constructed to complement a locking structure (not illustrated) formed on the display device 4, articulation device 5 or coupling structure 6, wherein the locking piece 70 can be moved between a locking position, in which the locking piece 70 engages in a positive-locking manner in the locking structure, and a release position, in which the locking piece 70 releases the locking structure, as schematically illustrated in FIG. 8 by the arrow P1. In FIG. 8, the locking piece 70 is illustrated in the release position with a solid line and in the locking position with a broken line. The locking piece 70 may, for example, be constructed in a parallelepipedal manner, whereby the display device can be secured in each case in accordance with a 90 degree pivot angle about the centre of rotation D4. Optionally, the locking piece 70 is pretensioned into the locking position, for example, by means of a spring (not illustrated).

FIG. 8 further shows an optional actuator 8 by means of which the display device 4 can be moved between the position for use and the storage position. The actuator 8 may, for example, be an electric motor and is kinematically coupled to the display device 4, for example, via the articulation device 5. As shown by way of example in FIG. 8, the actuator 8 may be functionally coupled to the processor unit 42 of the display device 4, wherein the processor unit 42 is configured to control the actuator 8. In particular, the processor unit 42 may be configured to produce control signals which cause the actuator to move the display device 4 between the position for use and the storage position.

Generally, there may be provision for the actuator to move the display device 4 from the position for use into the storage position when a specific flight criterion of the aircraft is complied with. The flight criterion may in particular be complied with when a specific flight phase is present, such as, for example, take-off, landing, taxiing or cruise flight, or when a specific flight status is present, such as, for example, flying through a region with turbulence. To this end, the actuator 8 may receive corresponding control signals from the processor unit 42 of the display device 4. Alternatively or additionally, the actuator 8 may be able to be functionally coupled to the data source 102 of the aircraft 100. The data source 102 may in this instance be formed by a control device of the aircraft 100 which is configured to produce control signals.

Although the present invention has been explained above by way of example with reference to embodiments, it is not limited thereto but can instead be modified in many ways. In particular, combinations of the above embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Galley monument
2 Shelf structure
3 Pull-out member
4 Display device
5 Articulation device
6 Coupling device
7 Securing device
8 Actuator
10 Galley component
11a Storage surface
20 Compartment walls
21 Sliding compartments
30 Carrier plate
30a First surface of the carrier plate
31 First end region of the carrier plate
32 Second end region of the carrier plate
33 Receiving recess
35 Plate frame
41 Display
42 Processor unit
43 Data store
44 Electrical energy store
45 Wireless communication interface
55 Supply lines
55A Electrical supply line
60 Frame
65 Locking structure
67 Interface
70 Locking piece
100 Aircraft
C Transverse direction
D4 Centre of rotation
E30 Deployment plane
H Vertical direction
I Graphical information
P1 Arrow
R3 Deployment direction
T Depth direction

The invention claimed is:
1. A galley monument for an aircraft comprising:
a shelf structure;
a pull-out member supported on the shelf structure and configured to be moved between an insertion position and a deployment position and having a carrier plate, wherein a first surface of the carrier plate in the deployment position of the pull-out member is located in a deployment plane and protrudes with respect to the shelf structure and is located in the insertion position at least partially inside the shelf structure; and
a display device supported on the pull-out member and having a display;
wherein the display device in the deployment position of the pull-out member is configured to be pivoted about a centre of rotation between a storage position, in which the display device extends parallel with the deployment plane, and a position for use, in which the display device extends transversely relative to the deployment plane, and
wherein the display of the display device is orientated in the storage position in the opposite direction to the first surface of the carrier plate.

2. The galley monument according to claim 1, wherein the centre of rotation is arranged in a first end region of the carrier plate and wherein the first end region of the carrier plate in the deployment position of the pull-out member is located facing the shelf structure.

3. The galley monument according to claim 1, wherein the centre of rotation is arranged in a second end region of the carrier plate and wherein the second end region of the carrier plate in the deployment position of the pull-out member is located facing away from the shelf structure.

4. The galley monument according to claim 1, wherein the first surface of the carrier plate comprises a receiving recess, and wherein the display device in the storage position is arranged in the receiving recess.

5. The galley monument according to claim 1, wherein the display of the display device in the storage position is orientated in the same direction as the first surface of the carrier plate.

6. The galley monument according to claim 1, wherein the display device is pivotably supported on the pull-out member by an articulation device.

7. The galley monument according to claim 6, wherein supply lines for supplying the display device inside the articulation device extend between the pull-out member and the display device.

8. A galley monument for an aircraft comprising:
a shelf structure;
a pull-out member supported on the shelf structure and configured to be moved between an insertion position and a deployment position and having a carrier plate, wherein a first surface of the carrier plate in the deployment position of the pull-out member is located in a deployment plane and protrudes with respect to the shelf structure and is located in the insertion position at least partially inside the shelf structure; and
a display device supported on the pull-out member and having a display;
wherein the display device in the deployment position of the pull-out member is configured to be pivoted about a centre of rotation between a storage position, in which the display device extends parallel with the deployment plane, and a position for use, in which the display device extends transversely relative to the deployment plane,
wherein the display device is pivotably supported on the pull-out member by an articulation device, and
wherein the display device is releasably coupled to the articulation device by a coupling device.

9. The galley monument according to claim 8, wherein the coupling device is constructed as a frame configured to lock the display device.

10. A The galley monument according to claim 1, further comprising for an aircraft comprising:
a shelf structure;
a pull-out member supported on the shelf structure and configured to be moved between an insertion position and a deployment position and having a carrier plate, wherein a first surface of the carrier plate in the deployment position of the pull-out member is located in a deployment plane and protrudes with respect to the shelf structure and is located in the insertion position at least partially inside the shelf structure;
a display device supported on the pull-out member and having a display; and
a securing device for securing the display device in the position for use and/or in the storage position,
wherein the display device in the deployment position of the pull-out member is configured to be pivoted about a centre of rotation between a storage position, in which the display device extends parallel with the deployment plane, and a position for use, in which the display device extends transversely relative to the deployment plane.

11. A galley monument for an aircraft comprising:
a shelf structure;
a pull-out member supported on the shelf structure and configured to be moved between an insertion position and a deployment position and having a carrier plate, wherein a first surface of the carrier plate in the deployment position of the pull-out member is located in a deployment plane and protrudes with respect to the shelf structure and is located in the insertion position at least partially inside the shelf structure;
a display device supported on the pull-out member and having a display; and
an actuator configured to move the display device between the position for use and the storage position,
wherein the display device in the deployment position of the pull-out member is configured to be pivoted about a centre of rotation between a storage position, in which the display device extends parallel with the deployment plane, and a position for use, in which the display device extends transversely relative to the deployment plane.

12. The galley monument according to claim 11, wherein the actuator is functionally coupled to a processor unit of the display device, and wherein the processor unit is configured to control the actuator.

13. An aircraft comprising a galley monument according to claim 1.

14. The galley monument according to claim 1, wherein the display device is releasably coupled to the articulation device by a coupling device.

15. The galley monument according to claim 1, further comprising a securing device for securing the display device in the position for use and/or in the storage position.

16. The galley monument according to claim 1, further comprising an actuator configured to move the display device between the position for use and the storage position.

17. The galley monument according to claim 16, wherein the actuator is functionally coupled to a processor unit of the display device, and wherein the processor unit is configured to control the actuator.

* * * * *